(12) United States Patent
Razak et al.

(10) Patent No.: US 11,187,150 B2
(45) Date of Patent: Nov. 30, 2021

(54) COMBINED CYCLE HEAT ENGINE COMPRISING A FIRST AND SECOND GAS TURBINE ENGINE

(71) Applicant: ROLLS-ROYCE plc, London (GB)

(72) Inventors: Ahmed M Y Razak, Derby (GB); Arthur L Rowe, Derby (GB)

(73) Assignee: ROLLS-ROYCE PLC, London (GB)

( * ) Notice: Subject to any disclaimer, the term of this patent is extended or adjusted under 35 U.S.C. 154(b) by 67 days.

(21) Appl. No.: 16/694,134

(22) Filed: Nov. 25, 2019

(65) Prior Publication Data

US 2020/0173364 A1   Jun. 4, 2020

(30) Foreign Application Priority Data

Nov. 30, 2018 (GB) ..................................... 1819564
Nov. 30, 2018 (GB) ..................................... 1819565

(51) Int. Cl.

| F02C 7/10 | (2006.01) |
| F01D 13/02 | (2006.01) |
| F02C 3/06 | (2006.01) |
| F02C 6/18 | (2006.01) |
| F01D 25/10 | (2006.01) |

(52) U.S. Cl.
CPC ............... *F02C 7/10* (2013.01); *F01D 13/02* (2013.01); *F01D 25/10* (2013.01); *F02C 3/06* (2013.01); *F02C 6/18* (2013.01); *F05D 2220/32* (2013.01); *F05D 2220/74* (2013.01); *F05D 2260/20* (2013.01); *F05D 2260/211* (2013.01); *F05D 2260/213* (2013.01)

(58) Field of Classification Search
CPC .... F02C 7/10; F02C 3/06; F02C 6/003; F02C 6/18; F05D 2260/211; F05D 2260/213
See application file for complete search history.

(56) References Cited

U.S. PATENT DOCUMENTS

| 2,814,181 A | 11/1957 | Schwartz |
| 4,147,024 A | 4/1979 | Moellmann |
| 4,569,195 A * | 2/1986 | Johnson ................... F02C 9/16 |
| | | 60/39.3 |

(Continued)

FOREIGN PATENT DOCUMENTS

| DE | 2848424 A1 | 5/1980 |
| WO | 97/04228 A1 | 2/1997 |

OTHER PUBLICATIONS

Search Report of the Intellectual Property Office of the United Kingdom for 1819565.1 dated May 15, 2019.

(Continued)

*Primary Examiner* — Scott J Walthour
(74) *Attorney, Agent, or Firm* — Oliff PLC

(57) ABSTRACT

A combined cycle heat engine (10). The engine (10) comprises a first gas turbine engine (11) comprising a first air compressor system (14), a first combustion system (16) and a first turbine system (18) and a second gas turbine engine (32) comprising a second air compression system (36), a second turbine system (40), and a heat exchanger (38) configured to transfer heat from an exhaust (24) of the first turbine system (18) to compressed air from the second air compressor (36). The second gas turbine engine (32) comprises a second combustion system (20) downstream of the heat exchanger (38) and upstream of the second turbine system (40).

10 Claims, 10 Drawing Sheets

(56) References Cited

U.S. PATENT DOCUMENTS

| | | | |
|---|---|---|---|
| 5,813,215 A | 9/1998 | Weisser | |
| 5,937,633 A * | 8/1999 | Wang | F02C 3/36 |
| | | | 60/792 |
| 2017/0298816 A1 | 10/2017 | Razak et al. | |

OTHER PUBLICATIONS

Mar. 31, 2020 Search Report issued in European Patent Application No. 19 20 6263.

Czaja, D. et al., "Selection of Gas Turbine Air Bottoming Cycle for Polish compressor stations," Journal of Power Technologies, vol. 93, No. 2, 2013, pp. 67-77.

Czaja, D. et al., "Operation of a Gas Turbine Air Bottoming Cycle at Part Load," Journal of Power Technologies, vol. 93, No. 5, 2013, pp. 279-286.

Apr. 14, 2020 extended Search Report issued in European Patent Application No. 19206261.0.

U.S. Appl. No. 16/694,047, filed Nov. 25, 2019 in the name of Razak, A.

May 15, 2019 Search Report issued in British Patent Application No. 1819564.4.

\* cited by examiner

COMBINED CYCLE HEAT ENGINE COMPRISING A FIRST AND SECOND GAS TURBINE ENGINE

CROSS-REFERENCE TO RELATED APPLICATIONS

This application claims the benefit of United Kingdom Patent Application No. 1819564.4 filed Nov. 30, 2018, and United Kingdom Patent Application No. 1819565.1 filed Nov. 30, 2018, the disclosures of which are herein incorporated by reference in its entirety.

TECHNICAL FIELD

The present disclosure concerns a combined cycle gas turbine engine.

BACKGROUND

Combined cycle gas turbine engines are known, and are typically used to increase the thermal efficiency of heat engines relative to simple cycle gas turbine engines.

In a combined cycle gas turbine engine, waste exhaust heat from a gas turbine engine is used to drive a second heat engine to produce additional net power, without increasing fuel burn.

One such cycle is known as an "Air Bottoming Cycle" (ABC). Air bottoming cycles incorporate a further Brayton cycle gas turbine engine as the second heat engine. Typically, the second engine comprises a compressor, a heat exchanger, and a turbine in flow series. The compressor draws in air and compresses it. This compressed air is heated by waste exhaust heat from the first gas turbine engine, before being expanded by the turbine. The turbine powers the compressor and a load, to provide net power.

Such cycles are disclosed for example in "Selection of Gas Turbine Air Bottoming Cycle for Polish compressor stations", by Daniel Czaja, Tadeusz Chmielniak, Sebastian Lepszy, published in the Journal of Power Technologies 93 (2) (2013) 67-77.

According to a first aspect there is provided a combined cycle heat engine comprising:
a first gas turbine engine comprising a first air compressor system, a first combustion system and a first turbine system; and
a second gas turbine engine comprising a second air compression system, a second turbine system, and a heat exchanger configured to transfer heat from an exhaust of the first turbine system to compressed air from the second air compressor;
wherein the second gas turbine engine comprises a second combustion system downstream of the heat exchanger and upstream of the second turbine system.

Advantageously, by providing a combined cycle gas turbine engine having first and second combustors provided in the first and second gas turbine engines respectively, greatly increased efficiency can be provided relative to both simple cycle gas turbine engines, and conventional combined cycle gas turbines. Further benefits and features of the disclosed system are set out below.

The second gas turbine engine may comprise a variable area nozzle downstream of the second turbine. It has been found that, by providing a variable area nozzle downstream of the second turbine, the second gas turbine can be maintained at a high overall pressure ratio when the second combustor is turned off, or operated at low levels. Consequently, high thermal efficiency can be maintained at low power.

The second gas turbine engine may comprise one or more variable area inlet and/or nozzle guide vanes. Advantageously, the compressor can be maintained without surging over a wide range of operating conditions, and the pressure ratio can be maintained at a high level, in spite of relatively low compressor rotational speeds.

The second compressor system may comprise a low pressure compressor and a high pressure compressor. The second turbine system may comprise a high pressure turbine and a low pressure turbine. The low pressure compressor may be coupled to the low pressure turbine by a low pressure shaft, and the high pressure compressor may be coupled to the high pressure turbine by a high pressure shaft, wherein the high and low pressure shafts are configured to rotate independently of one another. The second gas turbine engine may comprise a variable area nozzle downstream of the low pressure turbine. Advantageously, it has been found that by providing a second gas turbine engine in the form of a "two spool" gas turbine engine, high pressure ratios (and so high thermal efficiency) can be maintained when the second combustor is operated at a low level, or turned off.

The second gas turbine engine may comprise a power transfer arrangement configured to transfer mechanical power between the high pressure shaft and the low pressure shaft. Advantageously, it has been found that transferring power between the high and low pressure shafts enables control of compressor ratio when the second combustor is operated at low power or turned off, and may reduce or eliminate the need for a variable area nozzle.

The first turbine may comprise a first turbine section and a second turbine section, the first combustion system may comprise a first combustor provided between the first compressor system and the first turbine system, and a second combustor provided between the first turbine section and the second turbine section.

The second air compressor system may comprise a multi-stage compressor, comprising two or more rotor stages. The second gas turbine engine may comprise one or more intercooler, configured to reject heat from the second air compressor, between rotor stages. Advantageously, compressor work is decreased, while the temperature rise in the heat exchanger is increased, thereby increasing thermal efficiency of the second gas turbine engine.

According to a second aspect, there is provided a method of controlling a heat engine, the heat engine comprising:
a first gas turbine engine comprising a first air compressor system, a first combustion system and a first turbine system; and
a second gas turbine engine comprising a second air compressor system, a second turbine system, a heat exchanger configured to transfer heat from an exhaust of the first turbine system to compressed air from the second air compressor, a second combustion system downstream of the heat exchanger and upstream of the turbine, and a variable area nozzle downstream of the second turbine;
the method comprising modulating at least the variable area nozzle to maintain a target mass flow through the second compressor.

The method may comprise modulating at least the variable area nozzle to maintain the mass flow through the second compression to be substantially equal to a mass flow through the first compressor when the second combustor is not in operation.

The method may comprise modulating at least the variable area nozzle in accordance with a lookup table on the basis of one or more of current overall engine power output or engine power output set point.

According to a third aspect, there is provided a method of controlling a heat engine, the heat engine comprising:
- a first gas turbine engine comprising a first air compressor system, a first combustion system and a first turbine system; and
- a second gas turbine engine comprising:
  - a second air compression system comprising high and low pressure compressors;
  - a second turbine system comprising high and low pressure turbines;
  - a heat exchanger configured to transfer heat from an exhaust of the first turbine system to compressed air from the second air compression system;
  - a second combustion system downstream of the heat exchanger and upstream of the second turbine system;
  - the high pressure compressor being coupled to the high pressure turbine by a high pressure shaft and the low pressure turbine being coupled to the low pressure compressor by a low pressure shaft, the high and low pressure shafts being independently rotatable; and
  - a power transfer arrangement configured to transfer mechanical power between the high pressure shaft and the low pressure shaft;
  - the method comprising modulating at least power transferred by the power transfer arrangement to maintain a target mass flow through the second compression system.

The method may comprise modulating the power transferred by the power transfer arrangement to maintain the mass flow through the second compressor to be substantially equal to a mass flow through the first compressor when the second combustor is not in operation.

The method may comprise modulating at least the power transferred by the power transfer arrangement in accordance with a lookup table on the basis of one or more of current overall engine power output or engine power output set point.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 5 is a schematic view of a power transfer arrangement for the combined cycle heat engine of FIG. 4;

DETAILED DESCRIPTION

Figure 1:
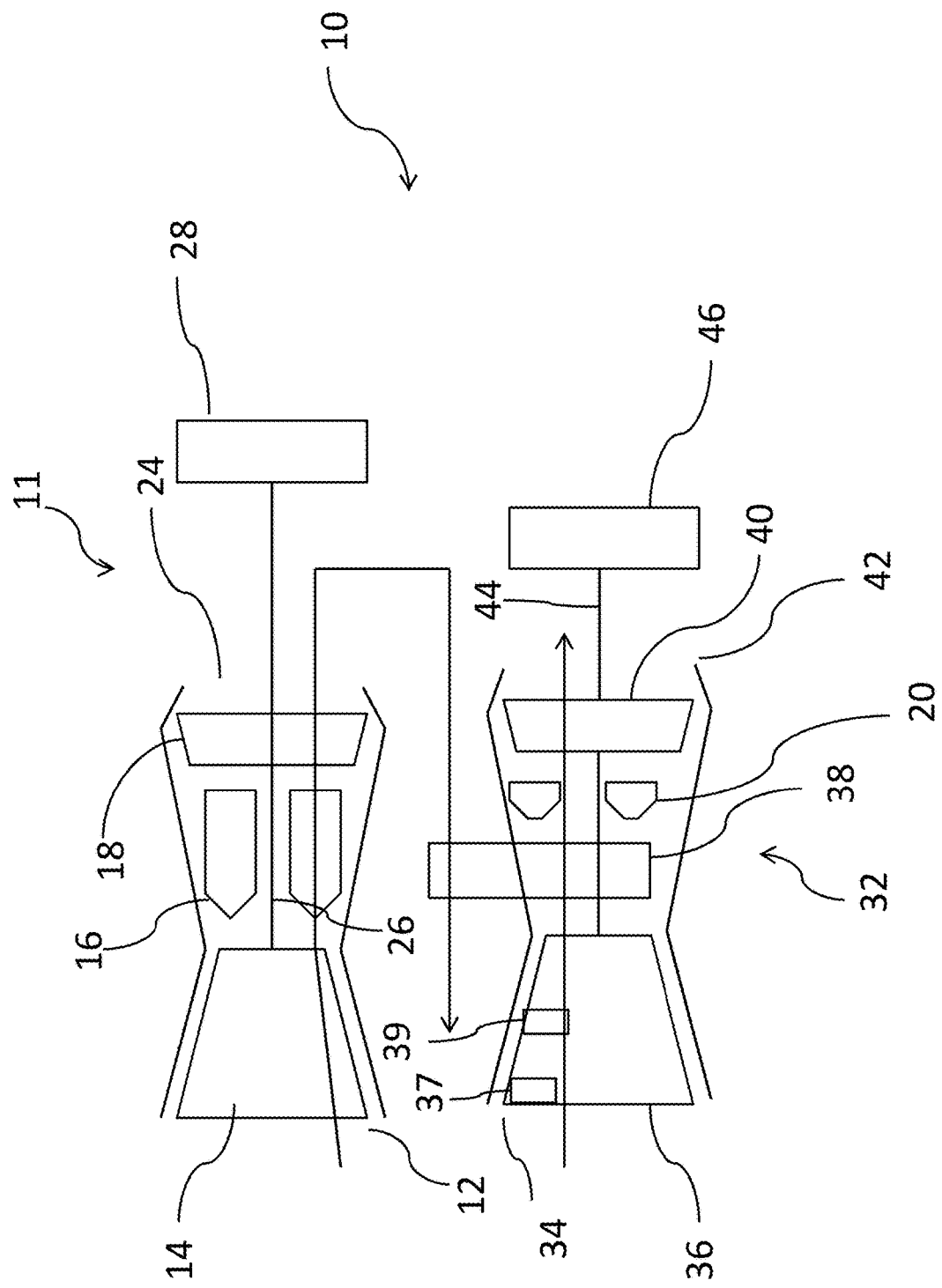
FIG. 1 is a schematic view of a first combined cycle heat engine.

With reference to FIG. 1, a first combined cycle heat engine is generally indicated at 10.

The combined cycle heat engine 10 comprises first and second Brayton cycle gas turbine engine engines, 11, 32, each having a respective principal and rotational axis. The first gas turbine engine 11 comprises, in axial flow series, an air intake 12, a first air compressor 14, a first combustion system comprising a first combustor 16, a first turbine system comprising a first turbine section 18, and an exhaust nozzle 24.

In operation, air entering the intake 12 is directed to the first air compressor 14, which compresses the air flow directed into it before delivering that air to the first combustor 16 where it is mixed with fuel and the mixture combusted. The resultant hot combustion products then expand through, and thereby drive the first turbine section 18, before air is expelled through the nozzle 24.

The first turbine section 18 and compressor 14 are coupled together by a core shaft 26, such that the first turbine section 18 drives the compressor 14. The core shaft 26 is also coupled to a load such as an electrical generator 28.

A recuperating heat exchanger 38 is also provided, downstream of the nozzle 24. The recuperating heat exchanger 38 comprises hot and cold sides in thermal contact with one another, and is configured to transfer heat from a first gas flow from the exhaust nozzle 24 of the first gas turbine engine 11, downstream of the first turbine section 18, to a second, relatively cooler gas flow. In use, gas flows from the nozzle 24, through the recuperating heat exchanger 38, thereby heating the second gas flow, before being vented to atmosphere. Optionally, further heat exchangers may be provided, such that the exhaust heat can be utilised for further purposes, such as water heating.

The combined cycle heat engine 10 further comprises a second Brayton cycle gas turbine engine 32. The second gas turbine engine comprises, in fluid flow series, an air inlet 34, a second air compressor 36, a cold side of the recuperating heat exchanger 38, a second turbine system 40, and an exhaust nozzle 42.

The second air compressor 36 comprises variable geometry features. In particular, the second compressor 36 comprises one or more of a variable inlet guide vane (VIGV) 37 and a variable stator vane (VSV) 39. The variable inlet guide vane comprises a static vane at the inlet of the second air compressor 36, and is configured to vary the angle of attack of air entering the compressor 36, and also to vary the area of the air compressor 36 inlet. Similarly, the variable stator vane 39 is provided downstream of the inlet, and downstream of one or more stages, and is also configured to vary the angle of attack of airflow on downstream components, and/or the area of the compressor at that point. This is typically achieved by providing a stator vane which pivots about its long axis (i.e. in a radial direction).

In operation, air entering the intake 34 of the second gas turbine engine 32 is directed to the second air compressor 36, which compresses the air flow directed into it before delivering that air to the cold side of the recuperator heat exchanger 38, where it is heated by waste heat from the exhaust of the first gas turbine engine 11. The recuperating heat exchanger adds heat to the air flow (which comprises the second air flow of the heat exchanger 38), to raise the temperature of the air flow, before directing this gas flow to the turbine 40. This airflow drives the turbine 40, before being vented to atmosphere. Again, further heat exchangers may be provided to utilise this high temperature air. Alternatively, the high temperature air may be utilised for space heating, since the air contains no combustion products.

The turbine 40 and compressor 36 are coupled together by a core shaft 44, such that the turbine 40 drives the compressor 36. The shaft 44 is also coupled to a load such as an electrical generator 46, such that the second gas turbine provides net external power to a load.

It has been found that the above described arrangement can provide for a very high overall thermal efficiency combined cycle heat engine. In studies, the engine has been found to have an overall thermal efficiency of up to 55%, while providing a highly compact, power dense arrangement. Since the combined cycle engine operates on air as the working fluid for both the first and second Brayton cycle gas turbine engines, no additional working fluid, such as distilled water, is required, making the system suitable for use on ships. The loads 28, 46 could be replaced by other suitable loads such as propulsive propellers or fans for ships or aircraft, since the high power density and high efficiency makes this cycle suitable for such applications.

The number of turbine stages of the first turbine section 18 is selected to provide the desired turbine pressure ratio at the desired shaft rotational speed for the maximum gas flow, utilising the minimum number of stages, as will be understood by the skilled person.

In studies, the inventors have found that particular turbine pressure ratios of the first turbine section 18 provide particular advantages. The pressure ratio of a turbine or turbine section can be found by dividing the pressure at the inlet of the turbine (i.e. upstream of a first turbine stage of the turbine or turbine section) by the pressure at the outlet of the turbine (i.e. downstream of a final turbine stage of the turbine or turbine section).

It has been found that power density of the full system can be maximised by providing a first turbine section 18 having a pressure ratio of between 2 and 5. This can typically be provided by a two stage turbine section. In some cases, an optimum power density can be provided by providing a first turbine section having a pressure ratio of between 3.5 and 4.75. This relationship appears to hold for a wide range of turbine entry temperatures and overall pressure ratios. Consequently, where power density (i.e. weight and/or size of the engine is the most important factor in the engine design), then turbines having the above properties should be selected.

On the other hand, thermal efficiency (and so fuel economy) can be maximised by providing a first turbine section having a pressure ratio of between 1 and 2. This can typically be provided by a single stage turbine section. In some cases, optimum energy efficiency can be provided by providing a first turbine section having a pressure ratio of approximately 1.5. Again, this relationship appears to hold for a wide range of turbine entry temperatures and overall pressure ratios. Consequently, where power density (i.e. weight and/or size of the engine is the most important factor in the engine design), then turbines having the above properties should be selected.

In order to optimise the overall cycle further, additional parameters should be selected.

One parameter that affects overall system efficiency is Overall Pressure Ratio (OPR) of the first gas turbine engine 11. This can be determined by measuring the total pressure at the air inlet 12, by the total pressure at the nozzle 24. The inventors have found that, in general, higher overall pressure ratios of the first gas turbine engine 11 result in higher overall system efficiency. Typically, the overall pressure ratio of the first gas turbine engine 11 is between 30:1 and 60:1. This contrasts with conventional bottoming cycle systems, in which higher overall pressure ratios does not correlate with increased overall system efficiency, since such systems result in relatively low exhaust temperatures for the bottoming cycle engine, which results in low efficiency for that engine. In conjunction with less than perfect component efficiencies, this typically results in cycle efficiencies peaking at lower overall pressure ratios. On the other hand, in the system presently disclosed, the relatively high exhaust temperatures, even at high OPRs, results in a highly efficient second gas turbine engine, and so a highly efficient cycle overall.

Similarly, OPR of the second gas turbine engine similarly affects overall system efficiency. Again, the OPR of the second gas turbine engine can be found by dividing the total pressure at the air inlet, by total pressure at the air outlet. It has been found that relatively low OPRs of between 3 and 8 provide the greatest overall system efficiency. In many cases, an optimum cycle efficiency is attained where the second gas turbine engine has an OPR of between 4 and 6. Again, this holds over a relatively wide range of turbine entry temperatures and first gas turbine engine OPRs.

A further parameter that affects efficiency is the Turbine Entry Temperature (TET) of the first turbine section 18. The TET can be determined by measuring the total temperature of the gasses entering the inlet of the first turbine section 18. It has been found that, in general, in the cycle of the present disclosure, overall efficiency increases as TET increases. Typically, TET is between 1400 Kelvin and 1800 Kelvin, though higher temperatures may be utilised. This is again in contrast with conventional bottoming cycle engines, in which efficiency typically does not increase with increasing turbine entry temperature.

The turbine entry temperature (TET) of the second turbine section 22 also effect thermal efficiency. Again, efficiency typically increases with increasing TET, though it may be desirable to set the TET of the second turbine section 22 at a lower value than the first turbine section 18, to minimise cooling losses.

Typically, during operation, the demand from the loads 28, 46 will vary. To provide the demanded loads, fuel to the combustor 16 of the first engine 11 is controlled such that the demand is met (which may be measured in terms of power, torque or rotational speed requirements). The fuelling of the first combustor 16 is made in accordance with a conventional fuelling schedule.

The engines 11, 32 are then controlled such that the mass flows through the two engines substantially match. Control can be affected through a variety of means (for example, compressor and/or turbine variable geometry, transfer between main engine shafts), and can be controlled in accordance with either a direct measurement of engine mass flow, or an inferred measurement based on parameters indicative of mass flow.

Figure 2:
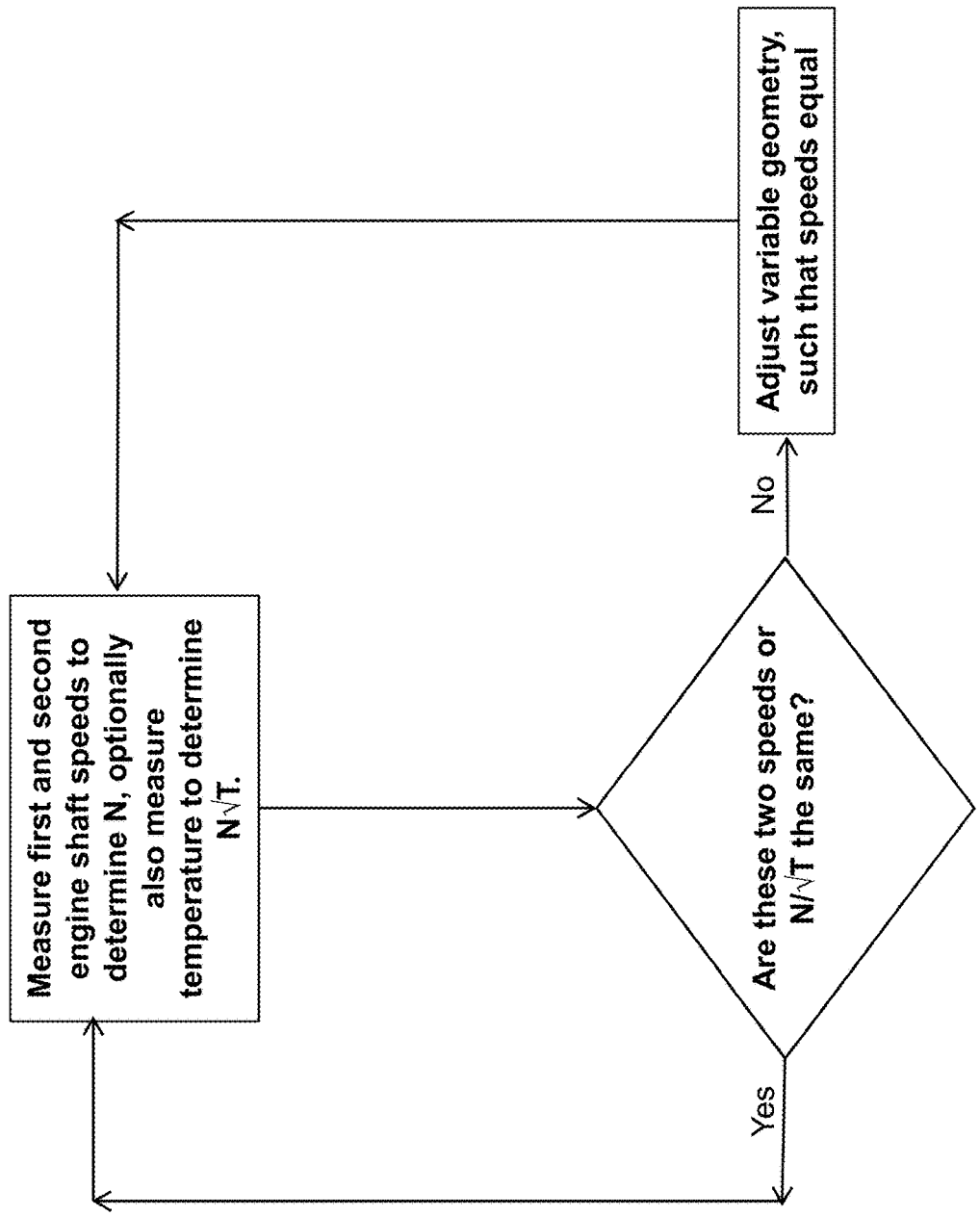
FIG. 2 is a flow diagram illustrating a method of control of the heat engine of FIG. 1.

FIG. 2 shows how the combined cycle heat engine is typically controlled, to provide maximum efficiency at a broad range of operating points in accordance with the above general scheme.

In a first step, a shaft speed of both the first and gas turbine engines 11, 32 is measured. Typically, in each case, the measured shaft speed is the speed of the shaft coupled to the respective output load (i.e. the electrical generators 28, 46 in this case). In the example of the first embodiment, the speeds of the shafts 26, 44 are measured.

In a second step, these speeds are compared to a target speed ratio. Where the relative speeds match a target value, no action is taken, and the engine continues to run. Where there is a mismatch of the speeds, the VIGV 37 or VSV 39 angle is changed, until the relative speeds match the target ratio to within a predetermined error. For example, where the compressors 14, 34 are of the same size (i.e. have the same inlet area), the target ratio is 1, such that the target speed of each engine is the same, since the mass flow would be expected to be the same at the same speed for each engine in this case. The control may typically be carried out by a closed loop controller, such as a proportional, integral, derivative (PID) controller, either implemented in hardware or software. Alternatively, for a more accurate estimate of compressor inlet mass flow, the temperature of the inlet air may be measured, and the engines 11, 32 may be controlled in accordance with the above scheme, but with speed replaced by "non-dimensional speed", i.e. the rotational speed divided by the square root of the absolute temperature. This may be useful where the two compressors 14, 24 draw air from different sources, which may be at different temperatures. An inner loop may be provided, which controls the compressor variable geometry to maintain compressor stability, i.e. to keep the compressor within its respective surge margin.

This control scheme can be adopted for operation where both of the combustors 16, 20 are in operation, or where only the first combustor 16 is in operation.

Figure 3:
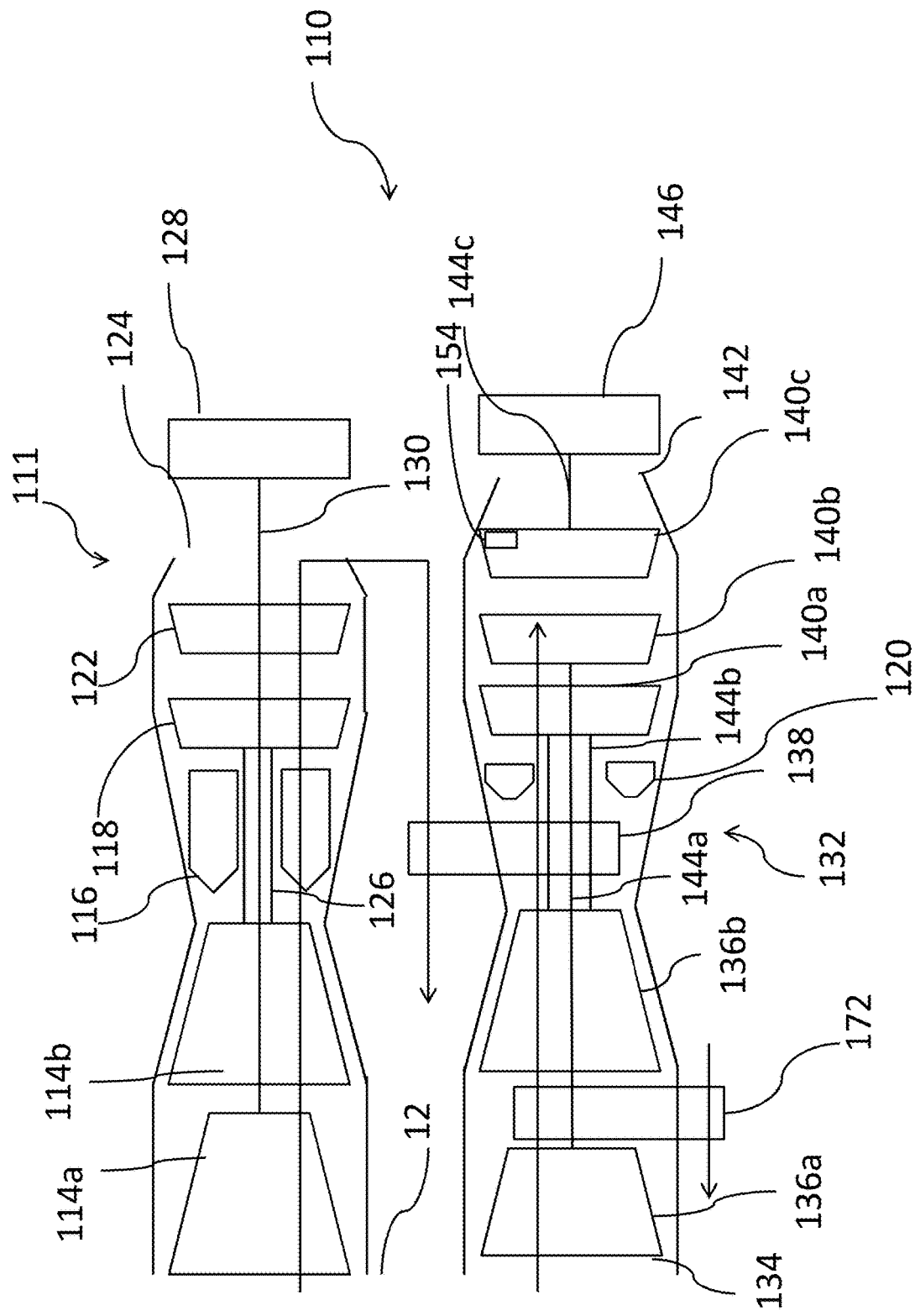
FIG. 3 is a schematic view of a second combined cycle heat engine.

FIG. 3 shows a second combined cycle heat engine 110, which differs from the first heat engine 10 in a number of ways.

In this example, the engine 110 comprises first and second Brayton cycle gas turbine engines, 111, 132, each having a respective principal and rotational axis. The first gas turbine engine 111 comprises, in axial flow series, an air intake 112, a first air compressor 114a, a second air compressor 114b, a first combustor 116, a turbine comprising a first turbine section 118, a second turbine section 122 of the turbine, and an exhaust nozzle 124.

Air flows through the engine 110 in a similar manner to the engine 10, as shown by the arrows. In this embodiment, the first turbine section 118 and second compressor 114b are coupled together by a core shaft 126, such that the first turbine section 118 drives the first compressor 114a. The second turbine section 122 is coupled to the second compressor 114b and a load such as an electrical generator 128 by a power shaft 130. Consequently, the shafts 130, 126, and so the turbines 118, 122 turn independently of one another. Again, it will be appreciated that the first turbine section 118 is provided as part of a first turbine spool, and the second turbine section 122 is provided as part of a second turbine spool, since they rotate independently of one another.

A second gas turbine engine 132 is also provided, which is similar to the engine 32. The second gas turbine engine comprises, in fluid flow series, an air inlet 134, a first air compressor 136a, an intercooler 172, a second air compressor 136b, a cold side of a recuperating heat exchanger 138, a turbine 140a, 140b, 140c, and a nozzle 142. A load 146 is coupled to the turbine 140c.

The turbine 140a, 140b, 140c comprises first, second and third turbine sections 140a, 140b, 140c respectively. The first turbine section 140a is coupled to the second air compressor 136b by a high pressure shaft 144b, the second turbine section 140b is coupled to the first air compressor 136a by a low pressure shaft 144a, and the third turbine section 140c is coupled to the load 146 by a free-power turbine 144c. Each of the turbines 140a, 140b, 140c spin independently of one another, and so represent different spools.

Again, air flows through the second gas turbine engine 132 in a similar manner to the engine 132. However, this is slightly modified by the addition of the intercooler 172. The intercooler 172 is a heat exchanger arranged to cool high temperature air downstream of the first compressor 136a by exchanging heat with ambient air (or another low temperature fluid), prior to delivering the cooled air to the second compressor 136b. By cooling the air between compression stages, several effects are achieved. Firstly, the work required to compress the air is increased, thereby increasing the pressure ratio of the engine for a given turbine power. However, this reduces the turbine entry temperature, by reducing the heat added during the cycle, which reduces the efficiency of the engine. Since the second gas turbine engine runs of heat from the first gas turbine engine however, the overall cycle efficiency is increased, since waste heat is utilised, rather than heat from burning fuel.

The second engine 132 also differs from the second engine 32 of the first embodiment, in that a different variable geometry system is provided. The third turbine section 140c comprises a variable outlet guide vane 154, which is similar to variable vanes of the compressor of the first embodiment, but applied to the turbine. Consequently, the guide vane 154 comprises a static vane at the outlet of the third turbine section 140c, and is configured to vary the area of the turbine 140c outlet. This is typically achieved by providing a stator vane which pivots about its long axis (i.e. in a radial direction).

Figure 4:
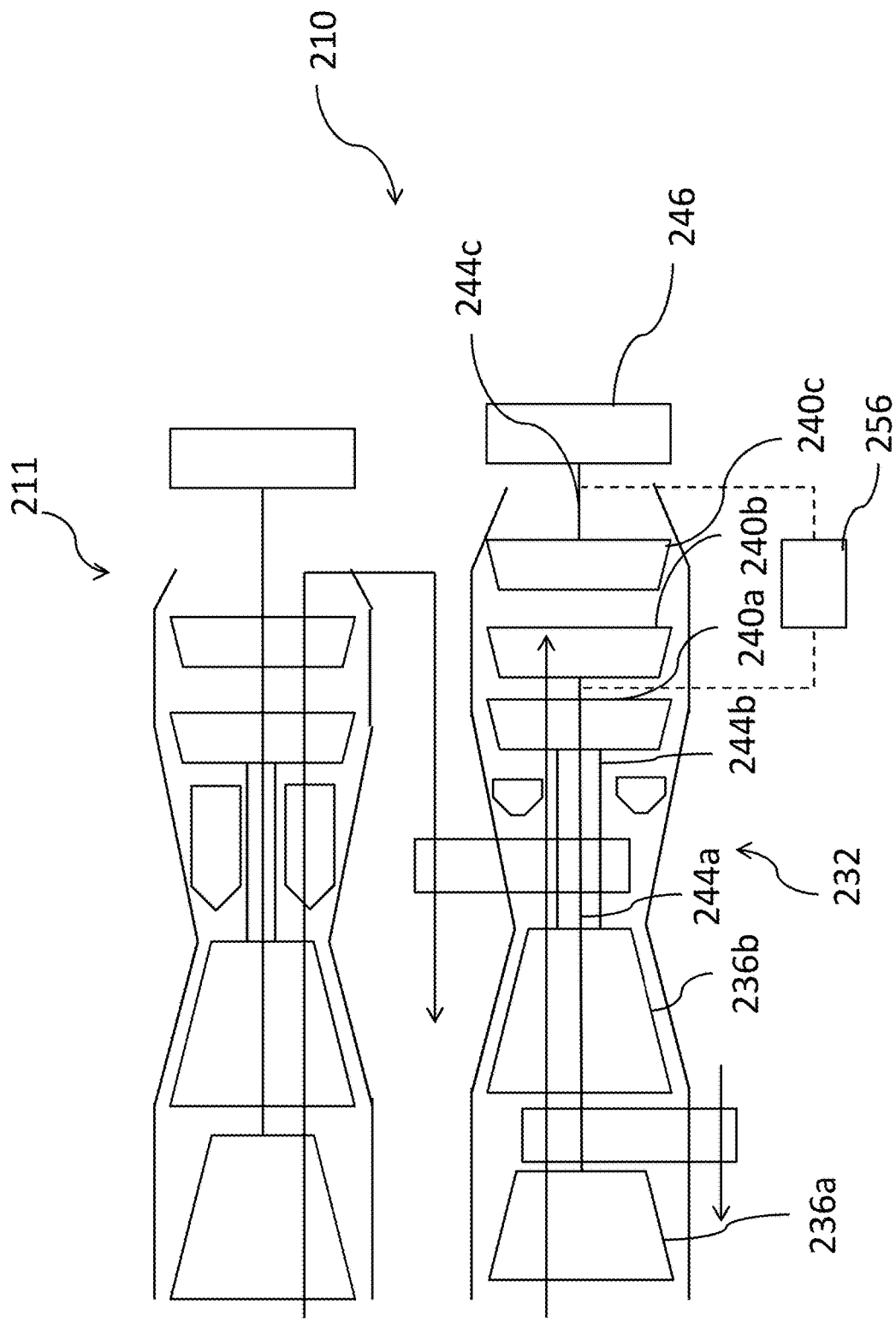
FIG. 4 is a schematic view of a third combined cycle heat engine.

FIG. 4 shows a third combined cycle heat engine 210, which differs slightly from the second heat engine 110.

In this example, the engine 210 comprises first and second Brayton cycle gas turbine engines, 211, 232. The first engine 211 is substantially the same as the first engine 111, and so will not be described further. The second engine 232 is similar to the second engine 132, except with regard to details of the intermediate and power spools.

The second engine again comprises three spools. A high pressure spool comprises a high pressure compressor 236b, high pressure turbine 240a and high pressure shaft 244b. An intermediate pressure spool comprises a low pressure compressor 236a, intermediate pressure turbine 240b and intermediate pressure shaft 244a. A free power shaft comprises a free power turbine 240c, load 246, and free power shaft 244c. In addition to (or in place of) a free power turbine VIGV 254, a power transfer arrangement 256 is provided. The power transfer arrangement 256 is configured to transfer mechanical power between the free power shaft 244c and intermediate pressure shaft 244a. This provides a similar function to the variable area nozzle 254, by transferring load between the intermediate and free power shafts 244a, 244c in use.

Various embodiments of the power transfer arrangement 256 can be envisaged. For example, the power transfer arrangement could comprise a fluid coupling, such as a torque converter. Alternatively, a mechanical gearbox such as a continuously variable transmission (CVT) could be used. A still further alternative is to transfer power using electric machines operating as motors and generators to transfer the power between shafts.

Figure 5:
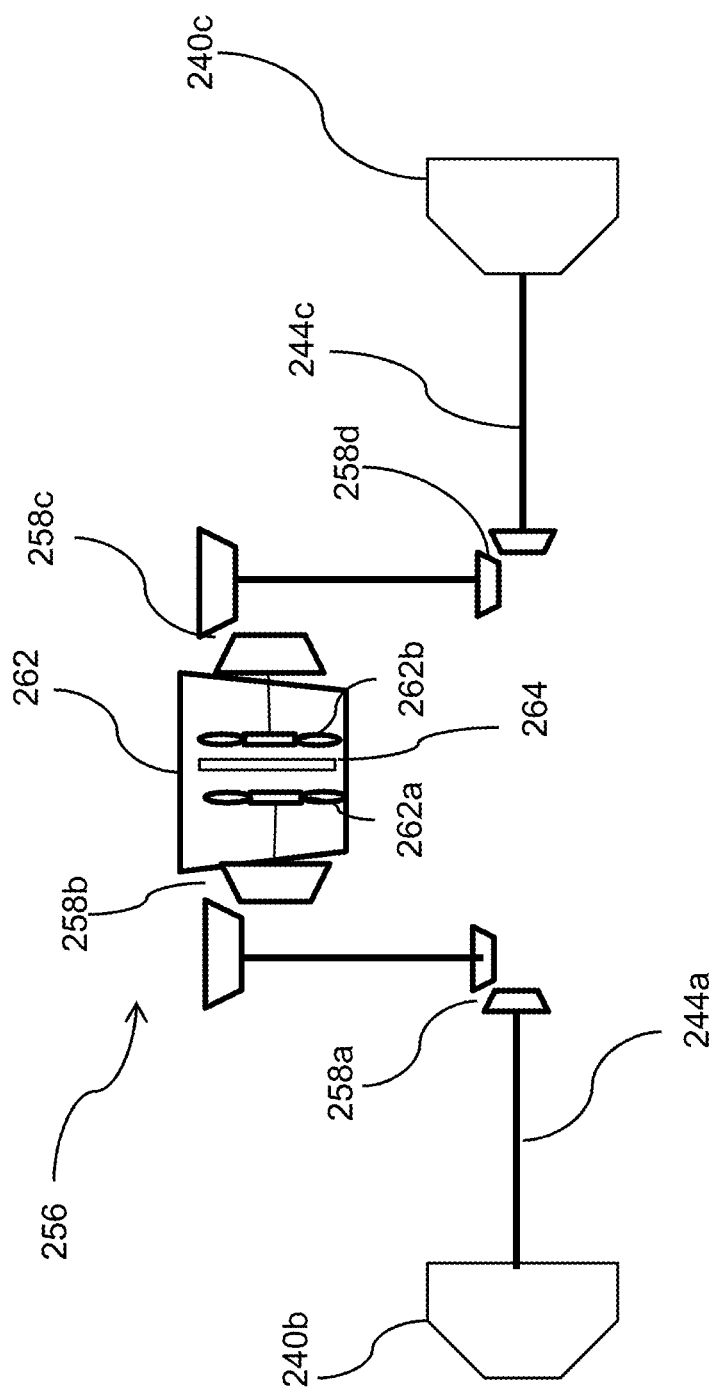
FIG. 5 is a schematic view of part of the combined cycle heat engine of FIG. 4.

FIG. 5 shows one embodiment of a power transfer arrangement 256 for the engine 210 of FIG. 4. The power transfer arrangement comprises a first bevel gear arrangement 258a, which couple to the intermediate pressure shaft 244a. A second bevel gear arrangement 258b couples to a first rotor 260a of a fluid coupling 262. The fluid coupling 262 further comprises a second rotor 260b, which is coupled to the free power turbine shaft 244c via third and fourth bevel gears 258c, 258d. The fluid coupling further comprises a variable stator 264 provided between the first and second rotors 262a, 262b. The fluid coupling 262 operates in a similar manner to an automotive automatic transmission, wherein, the stator 264 is controlled to control fluid flow between the rotors 262a, 262b, such that one acts as a turbine, and the other as a pump, to thereby transfer power between the free power turbine shaft 244c and intermediate pressure shaft 244a.

FIG. 5 shows one embodiment of a power transfer arrangement 256 for the engine 210 of FIG. 4. The power transfer arrangement comprises a first bevel gear arrangement 258a, which couple to the intermediate pressure shaft 244a. A second bevel gear arrangement 258b couples to a first rotor 260a of a fluid coupling 262. The fluid coupling 262 further comprises a second rotor 260b, which is coupled to the free power turbine shaft 244c via third and fourth bevel gears 258c, 258d. The fluid coupling further comprises a variable stator 264 provided between the first and second rotors 262a, 262b. The fluid coupling 262 operates in a similar manner to an automotive automatic transmission, wherein, the stator 264 is controlled to control fluid flow between the rotors 262a, 262b, such that one acts as a turbine, and the other as a pump, to thereby transfer power between the free power turbine shaft 244c and intermediate pressure shaft 244a.

Figure 6:
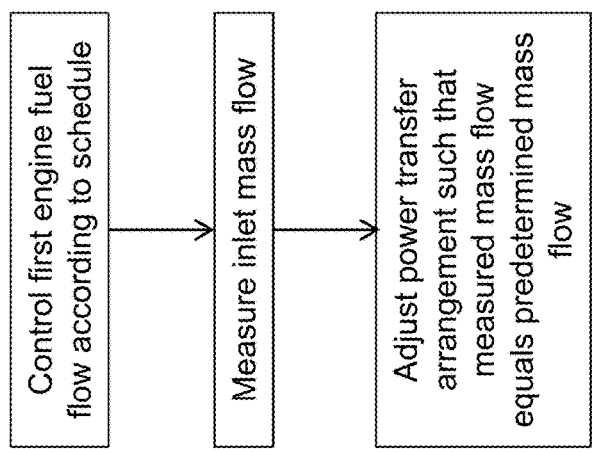
FIG. 6 is a flow diagram illustrating a method of operating of the combined cycle heat engine of FIG. 4.

Referring to FIG. 6, a control scheme for the engine 210 is defined. Again, the engine is controlled during low power conditions, to control mass flow through the engine, to control low pressure compressor 136a speed. However in this case, the control is provided by the power transfer arrangement 256. Consequently, the power transfer arrangement 256 is operated in accordance with an inlet mass flow set point, with power being transferred between the shaft 244a, 244c by the power transfer arrangement 256, such that the inlet mass flow set point corresponds to a measured or estimated actual inlet mass flow. Again, this may be controlled by open loop control, or closed loop control using, for example, a Proportional Integrative Derivative (PID) controller.

Figure 7:
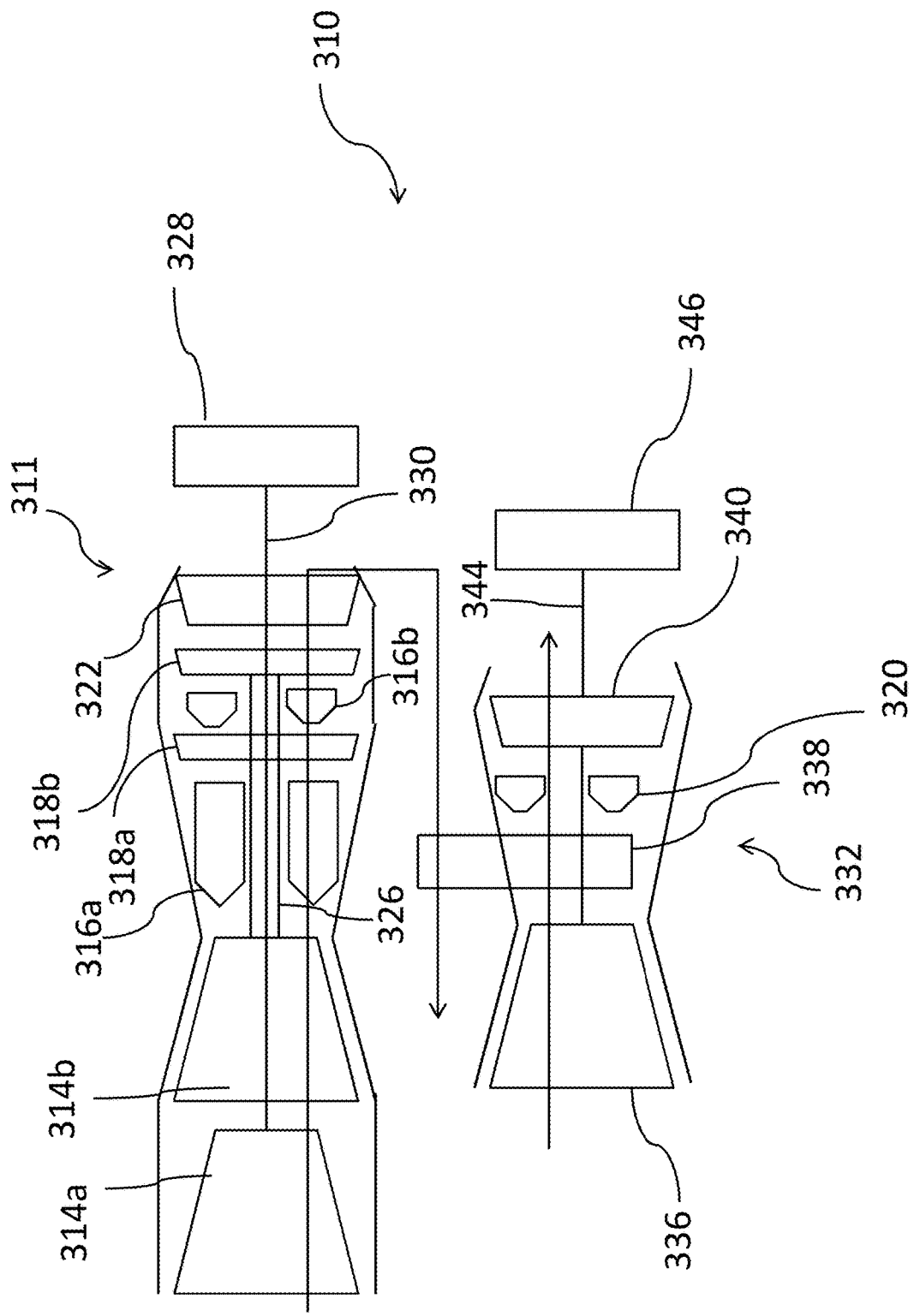
FIG. 7 is a schematic view of a fourth combined cycle heat engine.

FIG. 7 shows a third engine 310.

The engine comprises a first gas turbine engine 311, which is similar to the engines 111, 211, but differs in some important respects. The gas turbine engine 311 includes low and high pressure compressors 314a, 314b coupled to respective high and low pressure turbines 318, 322 by respective low and high pressure shafts 330, 326. A combustion system comprising a first combustor 316a is provided between the outlet of the high pressure compressor 314b, and the inlet of the high pressure turbine 318. However, the high pressure turbine 318 differs from the high pressure turbines of the previous embodiment.

The high pressure turbine comprises first and second turbine sections 318a, 318b, each comprising one or more turbine stages. A turbine stage comprises at least one turbine rotor, and, optionally, one or more turbine stators. In this case, each of the first and second turbine sections 318a, 318b comprises a single respective turbine rotor (not shown) with a turbine stator (not shown) provided downstream. In use, the turbine rotors (which are conventionally bladed rotors), rotate to provide motive power, while the stators redirect gas flow downstream of each rotor to guide the gas flow to the next rotor. Each of the turbine sections 318a, 318b are coupled to the same, high pressure shaft 326, and so rotate together, and so comprise part of the same spool.

The first combustion system further comprises a second combustor 316b in flow series between the first and second high pressure turbine sections 318a, 318b. The second combustor 316b is similar to the first, and controllable independently of the first combustor 316a of the first combustion system. Such an arrangement is known as "inter-turbine reheat" or ITR.

The low pressure turbine 322 on the other hand is similar to the low pressure turbine 122, and is coupled to both a load 328 and the low pressure compressor 314a.

A second gas turbine engine 322 is also provided. The second gas turbine engine 332 is similar to the second gas turbine engine 32 of the first embodiment, being of a single spool design, having a second compressor 334, recuperator heat exchanger 338, combustor 320, turbine 340 and load 346, which are coupled by a common shaft 344. Again, an intercooler may optionally be provided between compressor stages of the compressor 336.

Preferably, each of the compressor 336 and turbine 340 include variable inlet and/or nozzle guide vanes 350, 352, 354, which can be operated in a similar manner to the previous embodiments, to improve efficiency of the second gas turbine engine 332 during low power operation.

Figure 8:
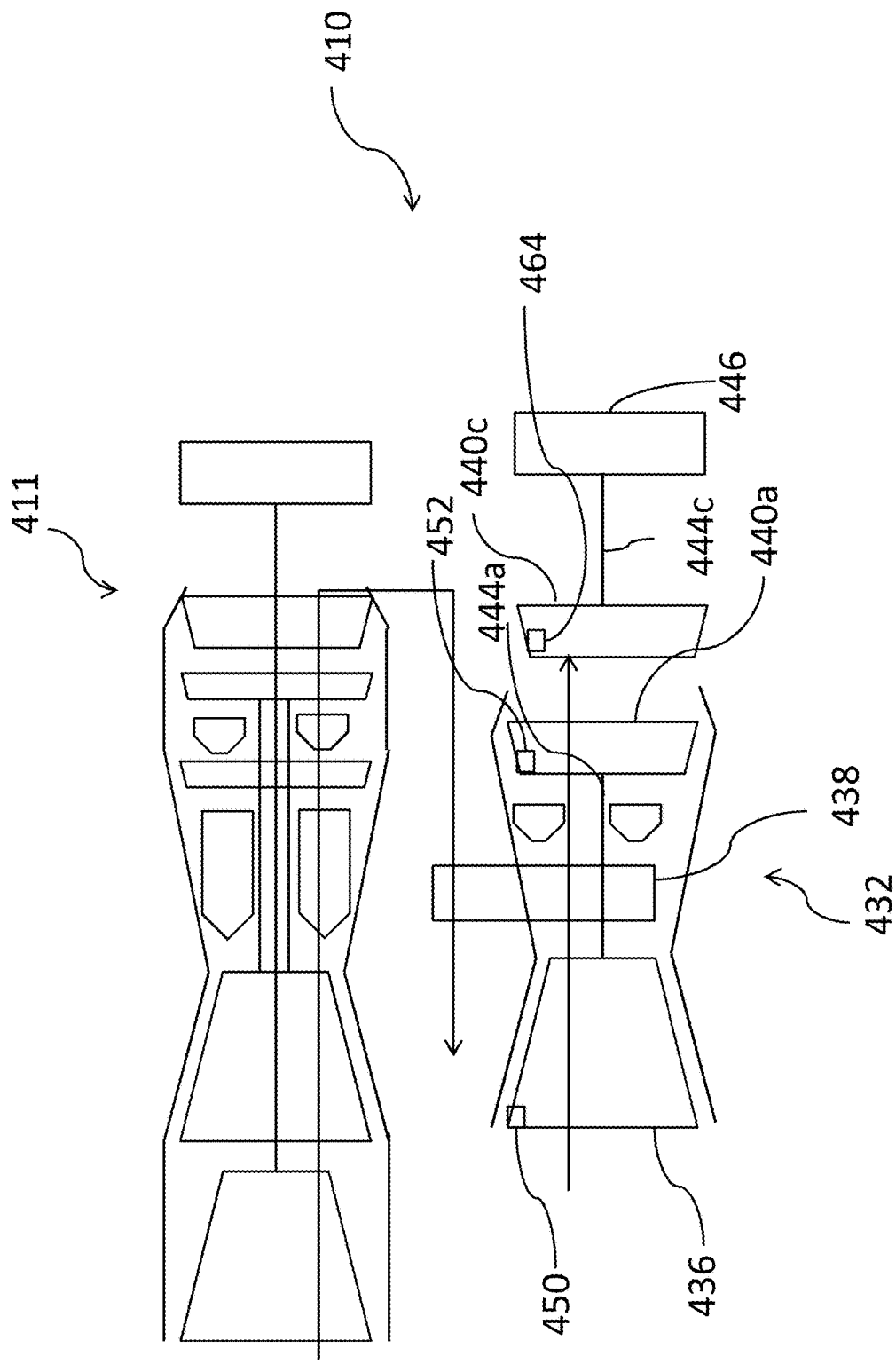
FIG. 8 is a schematic of a fifth combined cycle heat engine.
Figure 9:
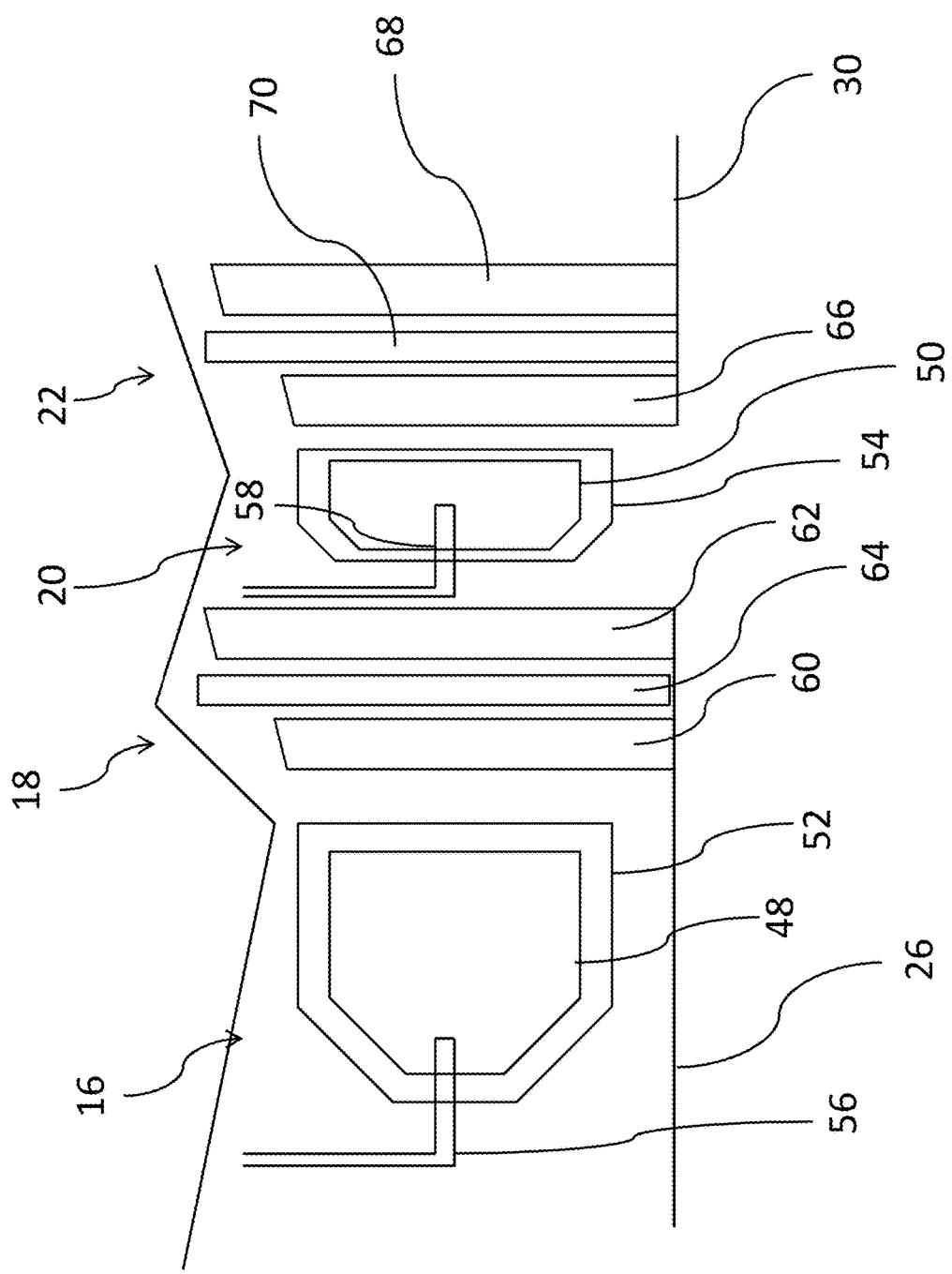
FIG. 9 is a schematic view of part of the combined cycle heat engine of FIG. 8.

FIG. 8 shows a fourth engine 410.

The fourth engine is similar to the third engine 310, and so only differences will be described.

The fourth engine comprises a first gas turbine engine 411, which is similar to the first gas turbine 311 of the third embodiment. A second gas turbine engine 432 is provided, which differs from the second gas turbine engine 332 in that a second, free power turbine 440c is provided in addition to a core turbine 440a. The core turbine 440a forms part of a first spool, along with a core compressor 436 and core shaft 444. The free power turbine 440c is coupled to a load 446 via a free power shaft 444c.

Preferably, each of the compressor 436 and both turbines 440a, 440c comprise variable inlet guide vanes and/or variable outlet guide vanes 450, 452, 464, to help improve efficiency of the engine 410 at low power levels.

Figure 10:
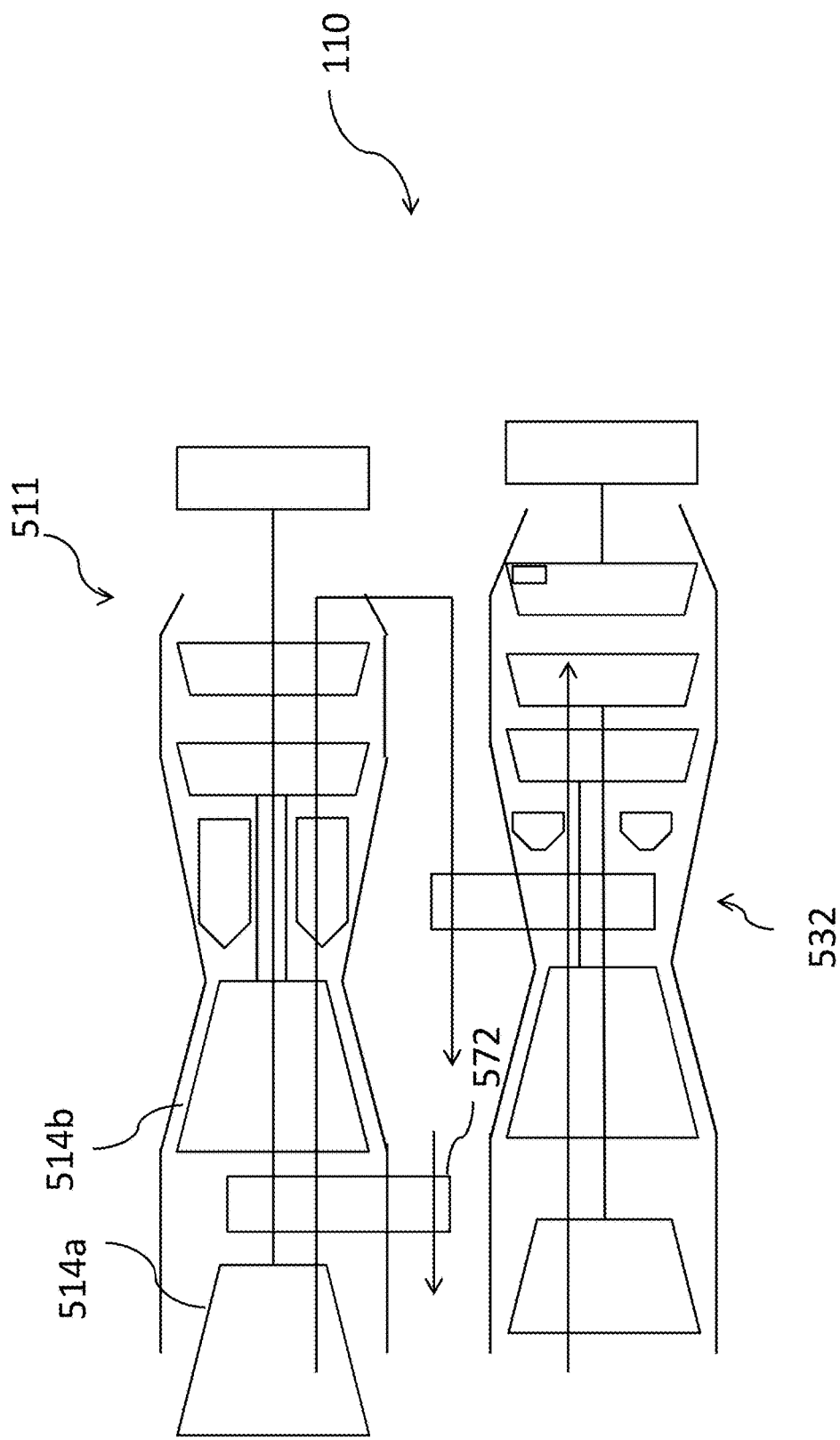
FIG. 10 is a schematic view of a sixth combined cycle heat engine.

FIG. 10 shows a sixth combined cycle heat engine 511. The engine is in many ways similar to the engine 111 of FIG. 3, and so only differences relative to that engine will be described in detail.

The combined cycle heat engine again comprises first and second gas turbine engines 511, 532, which operate in a similar manner to the engines 111, 132. However, the engine 511 differs to the engine 111 in that an intercooler 572 is provided between compressor stages of the first gas turbine engine 511. In this embodiment, the intercooler 572 is provided between low and high pressure compressors 514a, 514b, and operates in a similar manner to the intercooler 172, in that it cools compressor air prior to further compression, by exchanging heat with a lower temperature fluid, such as lower temperature air, water or some other medium.

The second gas turbine engine 532 could also be provided with an intercooler similar to the intercooler 172, though in this example the intercooler of the second gas turbine engine 532 is omitted.

By providing an intercooler in the first gas turbine engine 511 rather than or in addition to an intercooler in the second gas turbine engine 532, various advantages can be realised.

Conventionally, intercoolers can be used to reduce the temperature of compressed air prior to further compression by a downstream compressor. This reduces the work required to compress the air, and so allows for a higher efficiency. This also increase the amount of heat that can be added by the combustor without exceeding the temperature limits of the downstream turbines, and so increases power density. However, due to the lower work required for compression, less expansion is required by the turbines to provide the required work, and so temperatures downstream of the turbine are increased. In combination with the heat rejected by the intercooler, this increased heat rejection by the turbine represents enthalpy which is not used in the thermodynamic cycle of the engine, and so overall thermodynamic efficiency is reduced in some cases.

However, in the present case, this increased heat provided by the increased turbine outlet temperature is utilised in the second gas turbine engine 532. Consequently, the efficiency of the second gas turbine engine is raised due to the increased temperature difference between the inlet temperature and the maximum temperature in the heat exchanger, since thermal efficiency is related to this temperature difference by the well known Carnot efficiency equation:

$$\eta = 1 - \frac{T_C}{T_H}$$

Where $\eta$ represents efficiency, $T_C$ represents the outlet temperature of the cycle, and $T_H$ represents the inlet temperature of the cycle. Consequently, by adding an intercooler 372 to the first gas turbine engine 111, $T_C$ of the first cycle is increased, thereby reducing efficiency of that cycle. However, $T_H$ of the second cycle is then increased by this same amount, thereby maintaining high efficiency for the second engine 532, and so maintaining overall system thermal efficiency. Consequently, this architecture allows for an increase in power density, without a corresponding reduction in thermal efficiency.

In summary, the disclosed heat engines provide highly efficient engines, which can be operated to retain their high energy efficiency at low power levels.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the first embodiment could comprise an intercooler, or the intercooler could be deleted from the second or third embodiments. Similarly, the number or arrangement of shafts could be changed, so that the second combustor could be located between different turbine sections of the same spool, or of different spools in each of the embodiments, depending on requirements. Similarly, where multi-stage turbine spools are provided, the second combustor could be located between any two stages.

The invention claimed is:

1. A method of controlling a combined cycle heat engine, the combined cycle heat engine comprising:
   a first gas turbine engine comprising, in flow series, a first air compressor system, a first combustion system and a first turbine system for driving a first load; and
   a second gas turbine engine comprising, in flow series, a second air compressor system, a heat exchanger configured to transfer heat from an exhaust of the first turbine system to compressed air discharged from the second air compressor system, a second combustion system, and a second turbine system;
   wherein:
      the second air compressor system comprises, in flow series, a low-pressure compressor, an intercooler, and a high-pressure compressor;
      the second turbine system comprises, in flow series, one or more turbines for driving the low-pressure compressor and high-pressure compressor, a free power turbine for driving a second load, and a variable area nozzle;
   the method comprising:
      modulating at least the variable area nozzle to maintain a target mass flow through the second air compressor system, the target mass flow through the second air compressor system being substantially equal to a mass flow through the first air compressor system when the second combustion system is not in operation.

2. The method according to claim 1, wherein the second gas turbine engine further comprises a power transfer arrangement configured to transfer mechanical power between a high-pressure shaft and a low-pressure shaft, the method further comprising:
   modulating power transferred by the power transfer arrangement to maintain the target mass flow through the second air compressor system.

3. A combined cycle heat engine comprising:
   a first gas turbine engine comprising a first air compressor system, a first combustion system and a first turbine system configured to drive the first air compressor system and a load;
   a second gas turbine engine comprising, in flow series, a second air compressor system, a heat exchanger configured to transfer heat from an exhaust of the first turbine system to compressed air discharged from the second air compressor system, a second combustion system, and a second turbine system, wherein:
      the second air compressor system comprises, in flow series, a low-pressure compressor, an intercooler, and a high-pressure compressor; and
      the second turbine system comprises, in flow series:
         one or more turbines configured to drive the low-pressure compressor and the high-pressure compressor,
         a free power turbine configured to drive a second load, the free power turbine including a variable area nozzle, and
      the combined cycle heat engine further comprises a controller configured to modulate at least the variable area nozzle to maintain a target mass flow through the second air compressor system, the target mass flow through the second air compressor system being substantially equal to a mass flow through the first air compressor system when the second combustion system is not in operation.

4. The combined cycle heat engine according to claim 3, wherein the second air compressor system comprises one or more variable area inlets and/or variable stator vanes.

5. The combined cycle heat engine according to claim 3, wherein the second turbine system comprises a high-pressure turbine and a low-pressure turbine.

6. The combined cycle heat engine according to claim 5, wherein the low-pressure compressor is coupled to the low-pressure turbine by a low-pressure shaft, and the high-pressure compressor is coupled to the high-pressure turbine by a high-pressure shaft, wherein the high-pressure shaft is configured to rotate independently of the low-pressure shaft.

7. The combined cycle heat engine according to claim 6, wherein the second gas turbine engine comprises a power transfer arrangement configured to transfer mechanical power between the high-pressure shaft and the low-pressure shaft.

8. The combined cycle heat engine according to claim 7, wherein the controller is further configured to modulate power transferred by the power transfer arrangement to maintain the target mass flow through the second air compressor system.

9. The combined cycle heat engine according to claim 3, wherein:
    the first turbine system comprises, in flow series, a first turbine section and a second turbine section, and
    the first combustion system comprises a first combustor provided between the first air compressor system and the first turbine section, and a second combustor provided between the first turbine section and the second turbine section.

10. The combined cycle heat engine according to claim 3, wherein at least one of the low-pressure compressor and the high-pressure compressor in the second air compressor system is a multi-stage compressor, comprising two or more rotor stages.

* * * * *